United States Patent
Tochigi

Patent Number: 5,537,255
Date of Patent: Jul. 16, 1996

[54] ZOOM LENS

[75] Inventor: Nobuyuki Tochigi, Kanagawa, Japan

[73] Assignee: Canon Kabushiki Kaisha, Tokyo, Japan

[21] Appl. No.: 302,253

[22] Filed: Sep. 8, 1994

[30]    Foreign Application Priority Data

Sep. 17, 1993   [JP]   Japan ................................. 5-254990

[51] Int. Cl.$^6$ ................................................. G02B 15/14
[52] U.S. Cl. .......................................... 359/684; 359/683
[58] Field of Search ...................................... 359/683, 684

[56]                 References Cited
                U.S. PATENT DOCUMENTS

| | | | |
|---|---|---|---|
| 4,501,475 | 2/1985 | Fujita et al. | 359/683 |
| 4,702,567 | 10/1987 | Kato et al. | 359/684 |
| 5,202,992 | 4/1993 | Banno et al. | 359/684 |
| 5,414,562 | 5/1995 | Ueda | 359/683 |

FOREIGN PATENT DOCUMENTS

| | | |
|---|---|---|
| 58-129404A | 8/1983 | Japan . |
| 58-136012A | 8/1983 | Japan . |
| 58-160913A | 9/1983 | Japan . |
| 60-006914A | 1/1985 | Japan . |
| 61-258217A | 11/1986 | Japan . |
| 63-044614A | 2/1988 | Japan . |
| 63-247316A | 10/1988 | Japan . |

*Primary Examiner*—Georgia Y. Epps
*Assistant Examiner*—Michael A. Papalas
*Attorney, Agent, or Firm*—Fitzpatrick, Cella, Harper & Scinto

[57]                    ABSTRACT

A zoom lens comprising, from front to rear, a first lens unit of positive refractive power, a second lens unit of negative refractive power, a third lens unit of positive refractive power, a fourth lens unit of positive refractive power and a fifth lens unit of positive refractive power, the second lens unit being axially moved toward the image side to effect zooming from the wide-angle end to the telephoto end, while simultaneously moving the fourth lens unit to compensate for the shift of an image plane, and the fourth lens unit being axially moved to effect focusing, wherein the following condition is satisfied:

$$0.4 < f4/f5 < 1.2$$

where f4 and f5 are the focal lengths of the fourth and fifth lens units, respectively.

5 Claims, 6 Drawing Sheets

$F_{NO}/1.65$

-0.04  0.04
SPHERICAL ABERRATION $2\omega = 60.0°$

-0.04  0.04
ASTIGMATISM $2\omega = 60.0°$

-5.00  5.00
DISTORTION (%)

$F_{NO}/1.65$

-0.04  0.04
SPHERICAL ABERRATION $2\omega = 6.6°$

-0.04  0.04
ASTIGMATISM $2\omega = 6.6°$

-5.00  5.00
DISTORTION (%)

Fno / 1.65

-0.04　0.04
SPHERICAL ABERRATION

2ω=57.2°

-0.04　0.04
ASTIGMATISM

2ω=57.2°

-5.00　5.00
DISTORTION(%)

Fno / 1.90

-0.04　0.04
SPHERICAL ABERRATION

2ω=6.2°

-0.04　0.04
ASTIGMATISM

2ω=6.2°

-5.00　5.00
DISTORTION(%)

$F_{NO}/1.65$
SPHERICAL ABERRATION $2\omega=60.0°$
ASTIGMATISM $2\omega=60.0°$
DISTORTION(%)

$F_{NO}/1.65$
SPHERICAL ABERRATION $2\omega=6.6°$
ASTIGMATISM $2\omega=6.6°$
DISTORTION(%)

ZOOM LENS

BACKGROUND OF THE INVENTION

1. Field of the Invention

This invention relates to zoom lenses of the rear focus type and, more particularly, to high range, large relative aperture zoom lenses of the rear focus type with a long back focal distance to be used in photographic cameras, video cameras, or cameras for broadcasting. Still more particularly, it relates to such zoom lenses which have a range of about 10 and an F-number of about 1.6.

2. Description of the Related Art

For a zoom lens in a photographic camera or video camera, the focusing method of moving other than the front or first lens unit has been previously proposed. The so-called rear focus type then has found its use in many zoom lenses.

In general, as compared with the type in which the first lens unit is used for focusing, the rear focus type has surpassing advantages that the effective diameter of the first lens unit gets smaller, that it becomes easier to minimize the bulk and size of the entire lens system, that a close-focusing capability, especially a super close-focusing one, is readily built there into, and that, because the focusing lens unit is relatively small in size and light in weight, a weaker driving power for that lens unit suffices, which enables the focus adjustment to speed up.

A zoom lens that embodies such features of the rear focus type is exemplified in Japanese Laid-Open Patent Application No. Sho 63-44614, comprising, from front to rear, a first lens unit of positive refractive power, a second lens unit of negative refractive power for varying the focal length, a third lens unit of negative refractive power for compensating for the shift of the image plane with zooming and a fourth lens unit of positive refractive power. That is, in application to the so-called 4-unit zoom lens, the third lens unit is made movable for focusing. This zoom lens has, however, a tendency to increase its physical length, because there is need to create a surplus space for allowing the third lens unit to move only for focusing purposes.

Another zoom lens in Japanese Laid-Open Patent Application No. Sho 58-136012 has its zooming section constructed with three or more lens units, one of which is used for focusing.

In Japanese Laid-Open Patent Application No. Sho 63-247316, a first lens unit of positive refractive power, a second lens unit of negative refractive power, a third lens unit of positive refractive power and a fourth lens unit of positive refractive power are arranged in this order from the object side, wherein the second lens unit moves axially to vary the focal length, while simultaneously moving the fourth lens unit to compensate for the image shift. Focusing is performed by moving the fourth lens unit.

In Japanese Laid-Open Patent Application No. Sho 58-160913, a first lens unit of positive refractive power, a second lens unit of negative refractive power, a third lens unit of positive refractive power and a fourth lens unit of positive refractive power are arranged in this order from the object side, wherein the first and second lens units move axially to vary the focal length, while simultaneously moving the fourth lens unit to compensate for the image shift. One or two of these movable lens units for zooming are used for focusing.

Japanese Laid-Open Patent Applications Nos. Sho 58-129404 and Sho 61-258217 show so-called 5-unit zoom lenses comprising, from front to rear, a first lens unit of positive refractive power, a second lens unit of negative refractive power, a third lens unit of positive refractive power, a fourth lens unit of positive refractive power and a fifth lens unit of negative refractive power. In this type of zoom lens, the fifth lens unit or a plurality of lens units including the fifth lens unit are used for focusing. In Japanese Laid-Open Patent Application No. Sho 60-6914, there is a unique proposal for a 5-unit zoom lens formed likewise as to the above, but having a property that for an objects at a particular finite distance, the focusing lens unit takes a constant axial position independently of any focal lengths.

In general, by employing the rear focus type in the zoom lens, the above-described advantages are obtained. Among these, the feasibilities of improving the compact form of the entire lens system, of doing quick and easy focusing, and further of readily affording the close-focusing capability are advantageous.

However, on the other hand, the range of variation of aberrations with focusing is increased rapidly. So, a very difficult problem comes to arise when the requirements of maintaining good stability of high optical performance throughout the entire focusing range and of limiting the size of the entire lens system to a minimum are to be fulfilled at once.

Particularly for a large relative aperture, high range zoom lens, the difficulty of obtaining high optical performance throughout the entire focusing range as well as throughout the entire zooming range increases rapidly.

It is also considered that the trend up to now in the field of art of video cameras for public use is that most of their zoom lenses have been adapted for the single chip type image sensor. In this case, the color separation prism and associated parts therewith are not used, which are prerequisite mainly to the lens system of the multiple-chip type for professional use. For this reason, the back focal distance is taken relatively short. In the case of the multiple-chip type, because of the necessity of disposing the color separation prism behind the photographic lens, it is required that the back focal distance be made considerably longer than that for the zoom lenses of the single chip type in the popular video cameras.

SUMMARY OF THE INVENTION

The invention is to elongate the back focal distance without having to sacrifice the compact form of the entire lens system. It is, therefore, an object of the invention to provide a zoom lens which has good optical performance at any station during zooming from the wide-angle end to the telephoto end, or throughout the entire zooming range, and at any station during focusing from the infinite object distance to the minimum object distance, or throughout the entire focusing range, while still permitting simplification of the form to be achieved despite the elongation of the back focal distance. Another or second object is to facilitate minimization of the size of the zoom lens by employing the rear focus type.

A zoom lens of the invention comprises, from front to rear, a first lens unit of positive refractive power, a second lens unit of negative refractive power, a third lens unit of positive refractive power, a fourth lens unit of positive refractive power and a fifth lens unit of positive refractive power, the second and fourth lens units being axially moved to effect zooming, the zoom lens being characterized in that letting the focal length of the i-th lens unit, when counted from the object side, be denoted by $f_i$, the following condition is satisfied:

$$0.4 < f4/f5 < 1.2 \tag{1}$$

In particular, another characteristic feature is that the fourth lens unit is used for focusing.

DETAILED DESCRIPTION OF THE PREFERRED EMBODIMENTS

Figure 1:
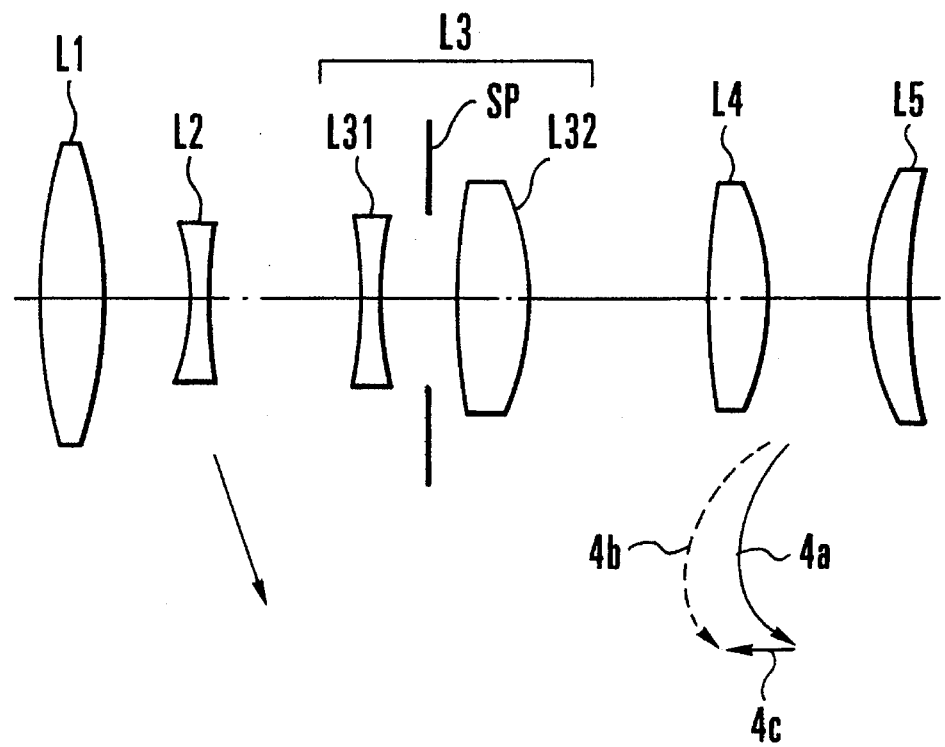
FIG. 1 is a schematic diagram of an embodiment of the invention with the paraxial refractive power arrangement shown.
Figure 2:
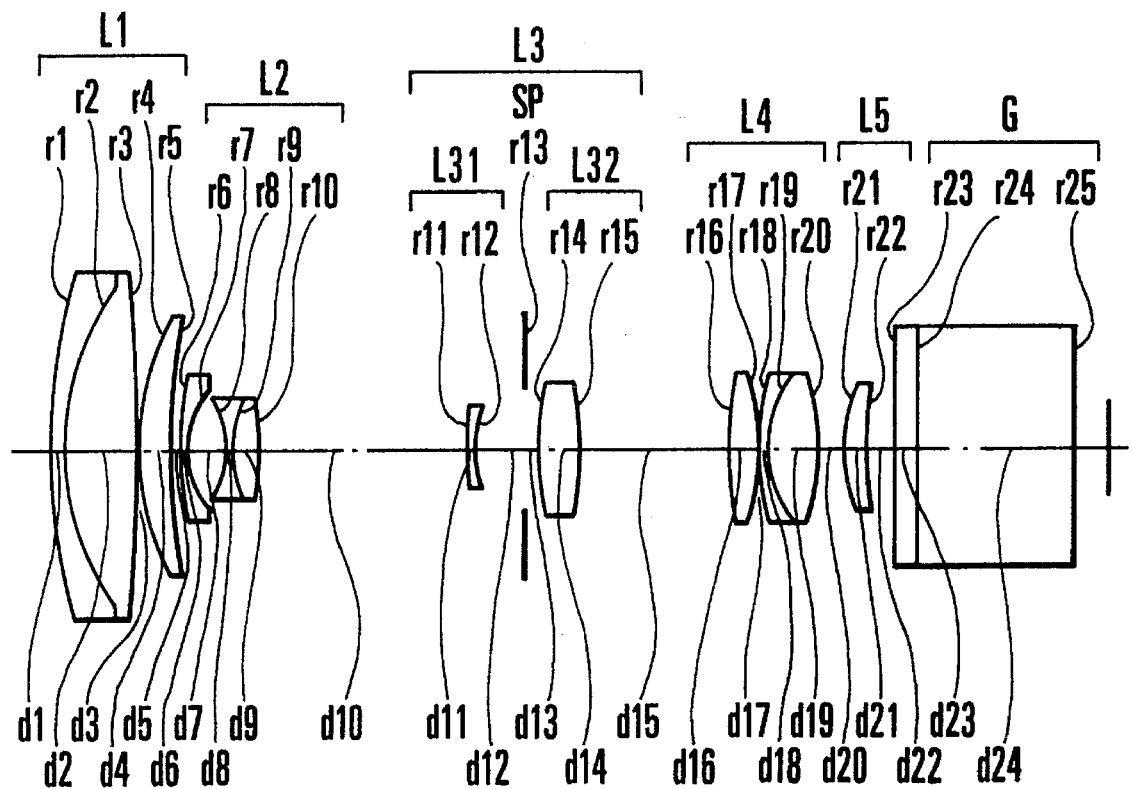
FIG. 2 is a lens block diagram of a numerical example 1 of the invention.
Figure 3:
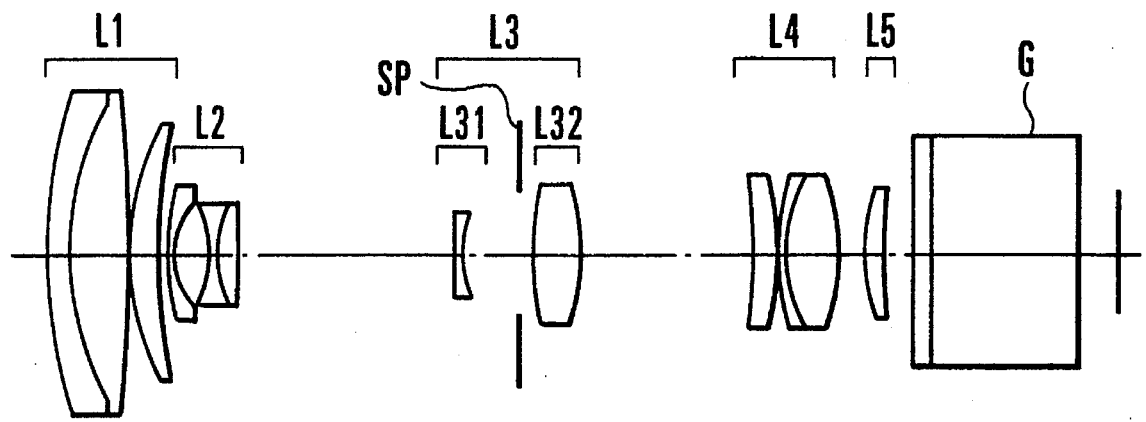
FIG. 3 is a lens block diagram of a numerical example 2 of the invention.
Figure 4:
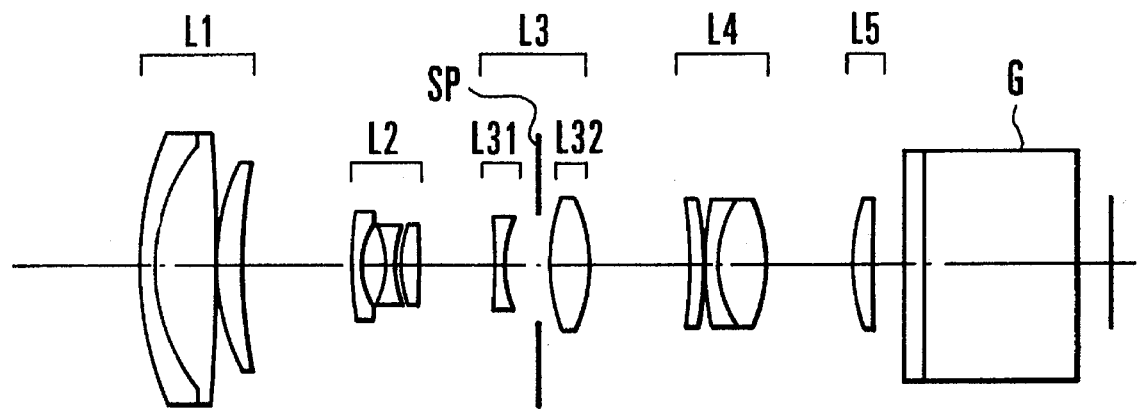
FIG. 4 is a lens block diagram of a numerical example 3 of the invention.
Figure 5:
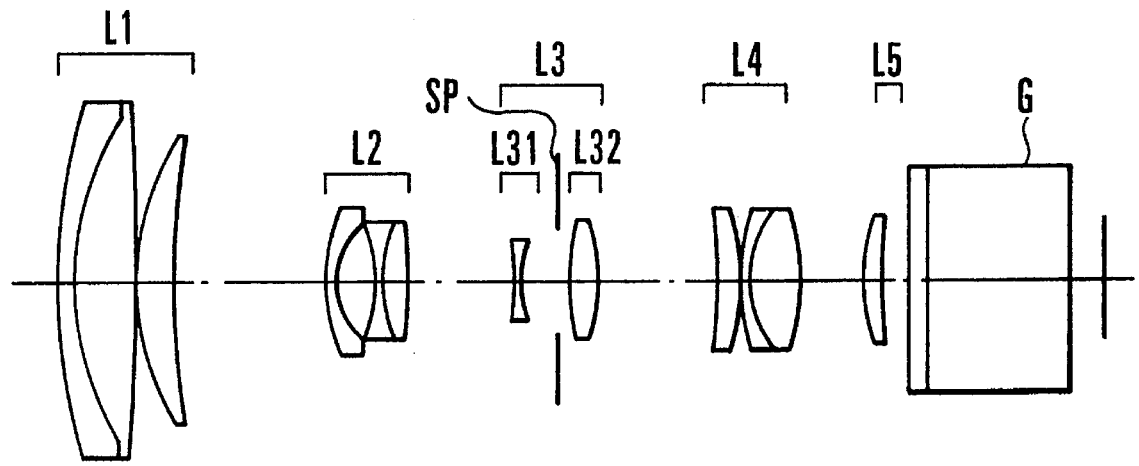
FIG. 5 is a lens block diagram of a numerical example 4 of the invention.
Figure 6A:
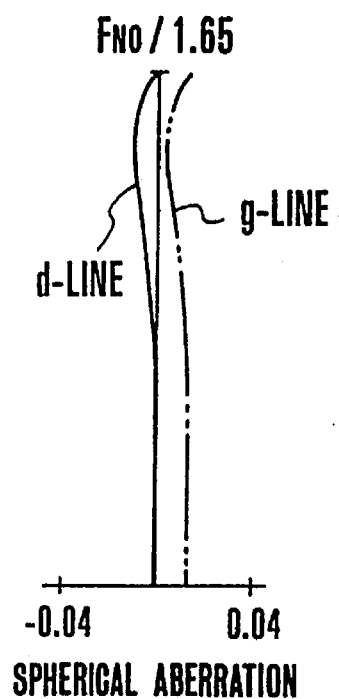
FIGS. 6A–6C show graphs of the aberrations of the numerical example 1 of the invention in the wide-angle end.
Figure 6B:
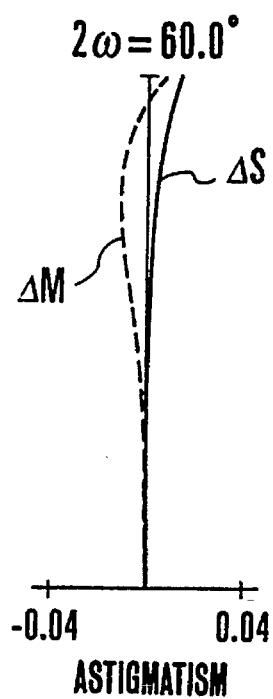
Figure 6C:
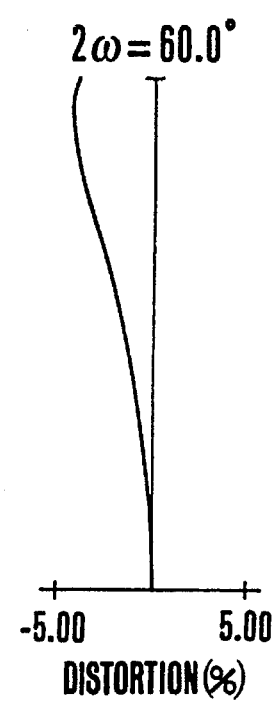
Figure 7A:
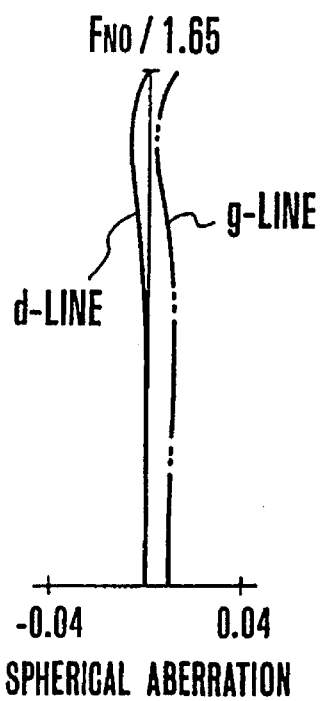
FIGS. 7A–7C show graphs of the aberrations of the numerical example 1 of the invention in the telephoto end.
Figure 7B:
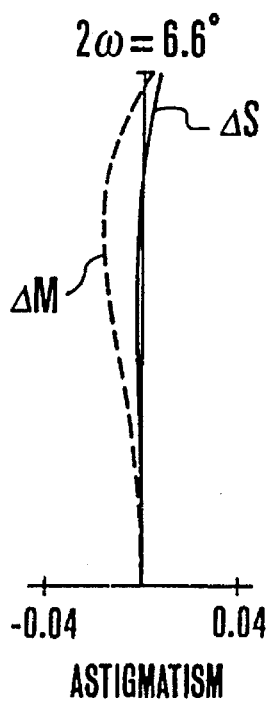
Figure 7C:
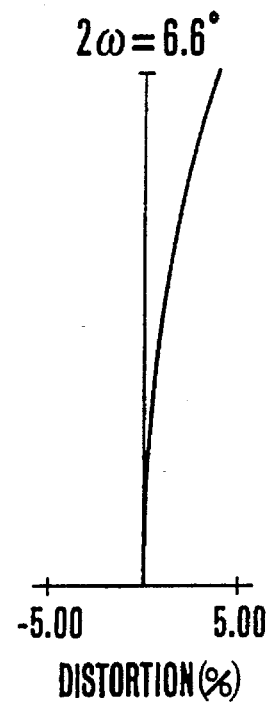
Figure 8A:
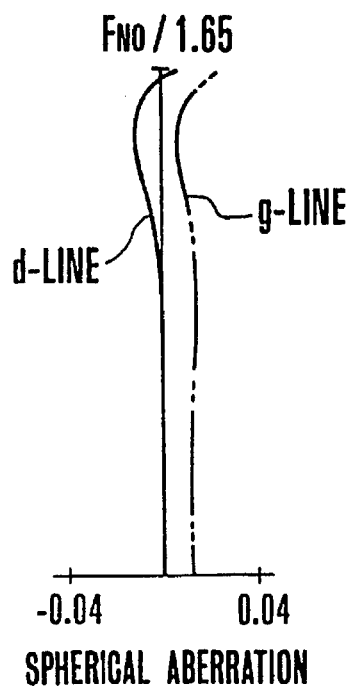
FIGS. 8A–8C show graphs of the aberrations of the numerical example 2 of the invention in the wide-angle end.
Figure 8B:
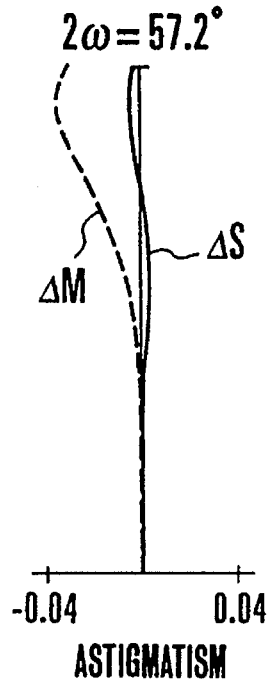
Figure 8C:
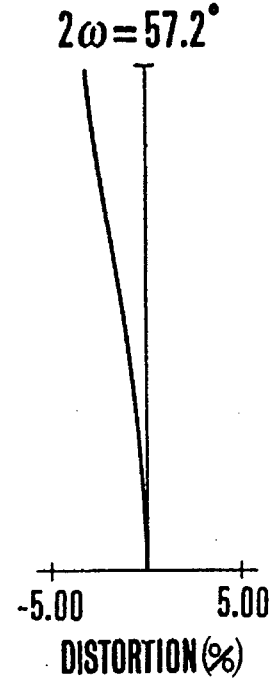
Figure 9A:
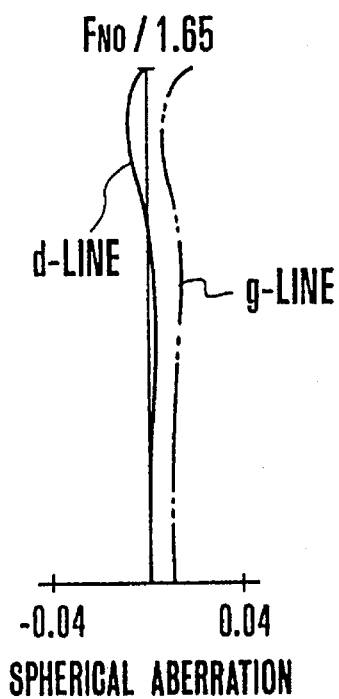
FIGS. 9A–9C show graphs of the aberrations of the numerical example 2 of the invention in the telephoto end.
Figure 9B:
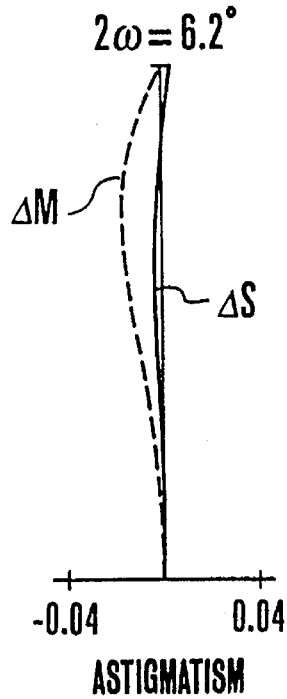
Figure 9C:
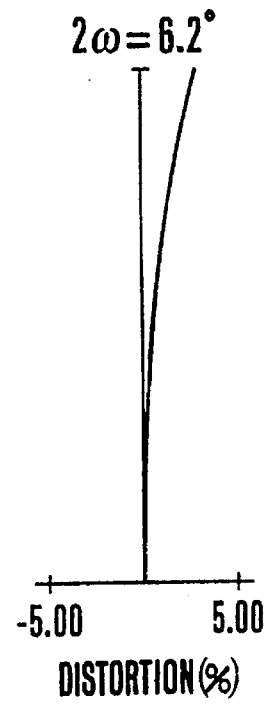
Figure 10A:
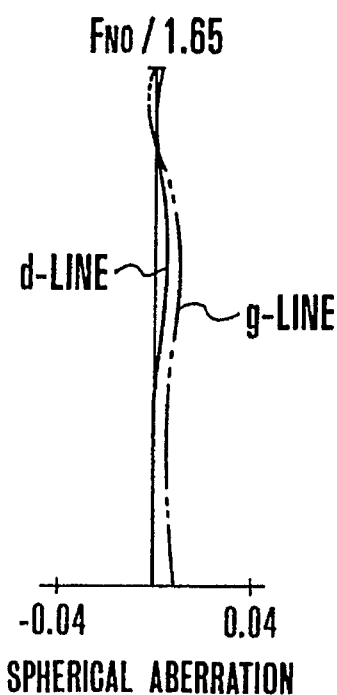
FIGS. 10A–10C show graphs of the aberrations of the numerical example 3 of the invention in the wide-angle end.
Figure 10B:
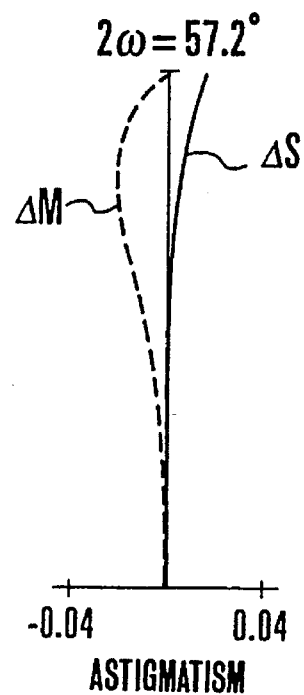
Figure 10C:
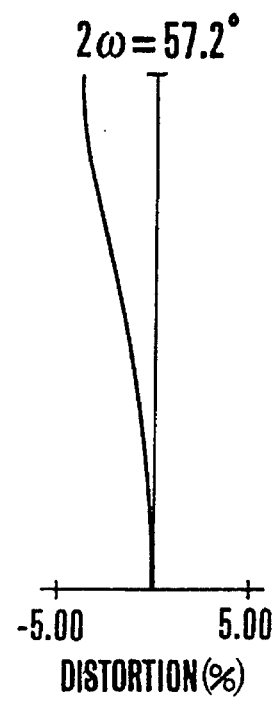
Figure 11A:
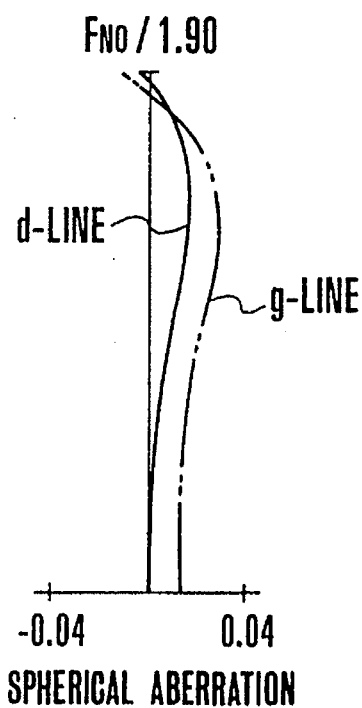
FIGS. 11A–11C show of the aberrations of the numerical example 3 of the invention in the telephoto end.
Figure 11B:
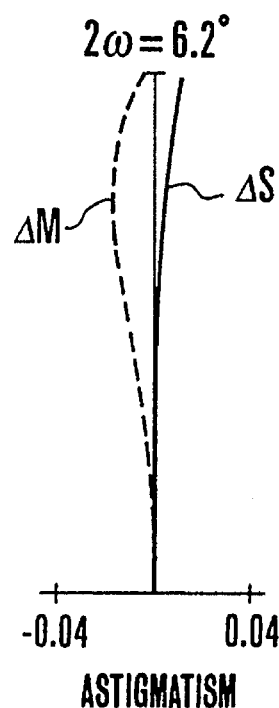
Figure 11C:
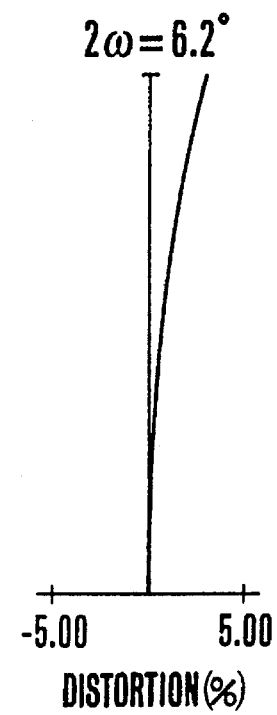
Figure 12A:
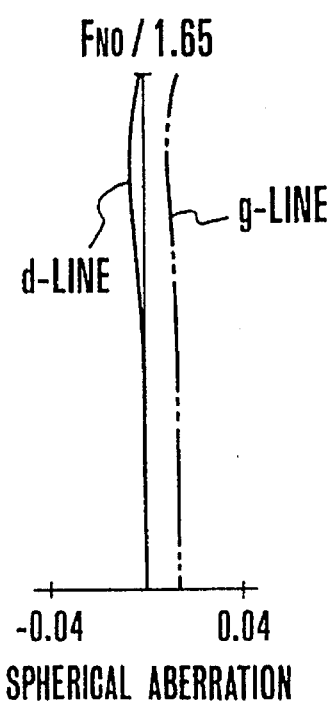
FIGS. 12A–12C show of the aberrations of the numerical example 4 of the invention in the wide-angle end.
Figure 12B:
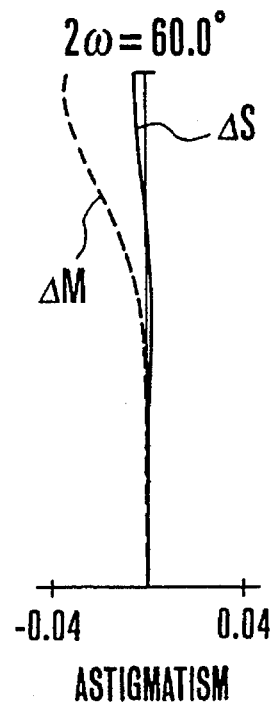
Figure 12C:
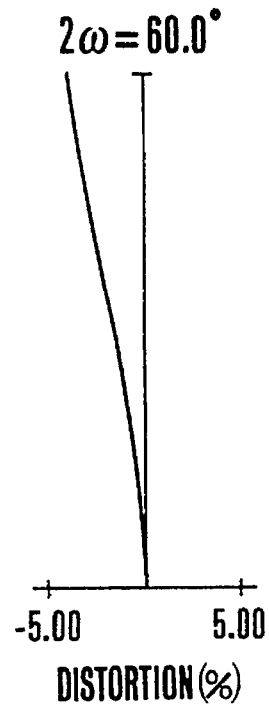
Figure 13A:
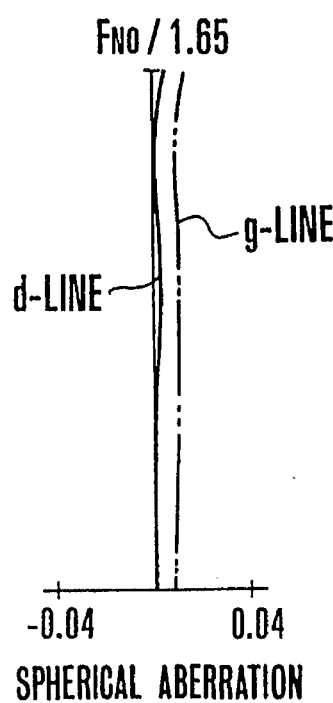
FIGS. 13A–13C show of the aberrations of the numerical example 4 of the invention in the telephoto end.
Figure 13B:
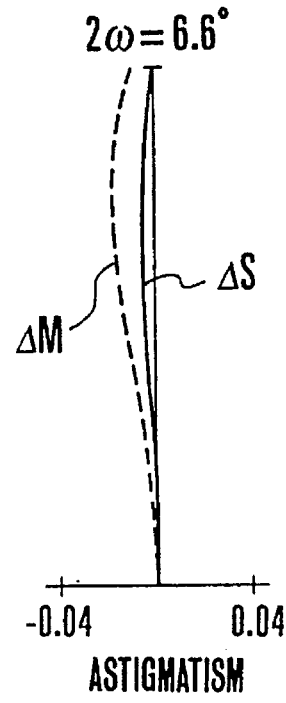
Figure 13C:
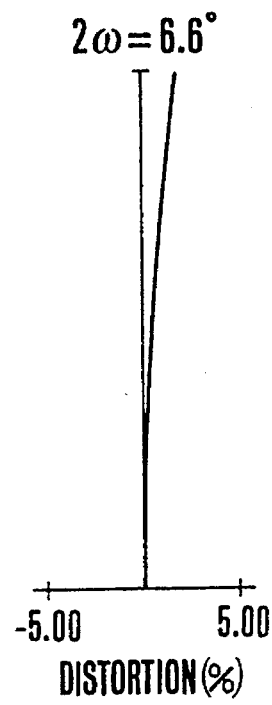

FIG. 1 shows the paraxial refractive power arrangement of an embodiment of a zoom lens according to the invention. FIGS. 2 to 5 in longitudinal section view show four examples of zoom lenses of the invention of which the numerical data are listed later. The aberrations of the numerical example 1 for the wide-angle and telephoto ends are shown in FIGS. 6A–6C and 7A–7C. The aberrations of the numerical example 2 for the wide-angle and telephoto ends are shown in FIGS. 8A–8C and 9A–9C. The aberrations of the numerical example 3 for the wide-angle and telephoto ends are shown in FIGS. 10A–10C and 11A–11C. The aberrations of the numerical example 4 for the wide-angle and telephoto ends are shown in FIGS. 12A–12C and 13A–13C.

In these drawings, reference character L1 denotes a first lens unit of positive refractive power, and reference character L2 denotes a second lens unit of negative refractive power. Reference character L3 denotes a third lens unit of positive refractive power, comprising a front lens sub-unit L31 of negative refractive power, a stop SP and a rear lens sub-unit L32 of positive refractive power. Reference character L4 denotes a fourth lens unit of positive refractive power, and reference character L5 denotes a fifth lens unit of positive refractive power. Reference character G stands for a face plate, a color separation prism or the like shown as a glass block in FIG. 1.

During zooming from the wide-angle end to the telephoto end, the second lens unit axially moves toward the image side as shown by the arrow, while simultaneously moving the fourth lens unit to compensate for the shift of an image plane.

Also for focusing purposes, the fourth lens unit is made movable. That is, the rear focus method is employed. In FIG. 1, for the focusing positions suited to an infinitely distant object and an object at the minimum distance, a solid line curve 4a and a dashed line curve 4b show respectively the loci of zooming movement of the fourth lens unit for compensating for the image shift with zooming from the wide-angle end to the telephoto end. Incidentally, the first, third and fifth lens units remain stationary during zooming or focusing.

In the present embodiment, the compensation for the image shift with zooming is effected by moving the fourth lens unit, and focusing is effected by moving the same or fourth lens unit. In particular, therefore, it should be pointed out that the total locus of zooming movement is made convex toward the object side as shown by the curves 4a and 4b. Thereby, effective utilization of the space between the third and fourth lens units is assured. Thus, a great shortening of the total length of the entire system is achieved.

In the present embodiment, for example in the telephoto end, it is forward that the fourth lens unit is moved to effect focusing from the infinite object distance to the minimum object distance, as shown by a straight line 4c in FIG. 1.

In the prior art, it has been the common practice that the 4-unit zoom lenses employ the focusing method of moving the first lens unit forward. In the present embodiment, on the other hand, by employing such a rear focus type as described before, the prevention of the effective diameter of the first lens unit from increasing is more facilitated than was possible in the prior art.

Another feature is that the aperture stop is positioned in between the front and rear lens sub-units of the third lens unit. Such positioning lessens the variation of aberrations due to the movable lens units and shortens the separations between the lens units that lie ahead of the aperture stop. By the latter, it is made easy to achieve an even greater shortening of the diameter of the front lens members.

Still another feature is that the fifth lens unit is constructed in the form of a single lens of meniscus shape convex toward the object side and the following conditions are satisfied:

$$0.8 < f3/f4 < 10 \tag{2}$$

$$1.0 < |f2/fw| < 2.5 \tag{3}$$

where fw is the shortest focal length of the entire system.

Particularly in the present embodiment, owing to the fact that the fifth lens unit is made to be a single positive lens of meniscus form convex toward the object side, the back focal distance and the eye-relief distance are increased with an advantage that, as a color separation prism is in use, color shading or a like defect is prevented from occurring at the reflecting surface (dichroic mirror) of the color separation prism.

That part of the third lens unit which lies on the image side of the stop, or the rear lens sub-unit of positive refractive power, is constructed in the form of a single lens having an aspheric surface so that the optical performance is maintained excellent over the entire area of the image frame with the size of the entire system being limited to a minimum. The other part, or the front lens sub-unit, is constructed in the form of a single negative lens to reduce the size of the entire lens system.

Although the present embodiment has been described in connection with the case of using only one aspherical lens as applied to the third lens unit, it is to be understood that another aspherical lens may be used in the other lens units. If so, not only is the performance further improved, but also the F-number can be sped up. Particularly when the additional aspherical lens is used in the fifth lens unit, the total number of constituent lens elements can be reduced. At the same time, the aspheric surface can be so figured out as to efficiently correct spherical aberration and comatic aberration. If still another aspheric surface is used in the fourth lens unit, coma and other aberrations can be efficiently corrected well.

The technical significance of each of the above-described conditions is explained below.

The inequalities of condition (1) are concerned with the ratio of the focal lengths of the fourth and fifth lens units and have an aim chiefly to make a good compromise between the construction of a system of the lens members that follow the stop in compact form and the formation of the back focal distance long enough to maintain good optical performance. When the focal length of the fifth lens unit is too long, or the focal length of the fourth lens unit is too short, as exceeding lower limit of the condition (1), it becomes difficult to correct well spherical aberration and others in such a manner that a long enough back focal distance is secured.

Conversely when the focal length of the fourth lens unit is too long as exceeding the upper limit, the total zooming or focusing movement of the fourth lens unit increases to increase the range of variation of all aberrations with zooming or focusing.

The inequalities of condition (2) are concerned with the ratio of the focal lengths of the third and fourth lens units and have an aim chiefly to well correct curvature of field. When the lower limit of the condition (2) is exceeded, as the focal length of the third lens unit is too short, a short back focal distance results. In application of such a zoom lens to, for example, a camera using a color separation prism on the image side thereof, it results in some cases that the given space is large enough to accommodate the color separation prism. In the other cases, the angles of incidence of light on the dichroic surfaces of the color separation prism are so steep that color shading is produced. So, it should be avoided.

Conversely when the focal length of the third lens unit is too long as exceeding the upper limit, it results in some cases that the Petzval sum of the entire system is largely undercorrected so that the inclination of the image focus becomes large. In other cases, the back focal distance becomes too long, causing the effective diameter of the fourth lens unit to increase. Because the focusing lens unit becomes heavy, smooth focus adjustment becomes impossible. So, it should be avoided.

The inequalities of condition (3) are concerned with the ratio of the focal length of the second lens unit to the shortest focal length of the entire system. When the focal length of the second lens unit is too short as exceeding the lower limit of the condition (3), large under-correction of the Petzval sum results. Therefore, the inclination of the image focus and other aberrations become difficult to correct. Conversely when the focal length of the second lens unit is too long as exceeding the upper limit, the total zooming movement of the second lens unit increases to increase the diameter of the front lens members objectionably.

Next, numerical examples of the invention are shown. In the numerical data for these examples, ri is the radius of curvature of the i-th lens surface, when counted from the object side, di is the i-th axial thickness or air separation, when counted from the object side, and Ni and νi are respectively the refractive index and Abbe number of the glass of the i-th lens element, when counted from the object side. In the numerical examples, the last three lens surfaces define a face plate and a filter or like glass blocks.

The values of the factors in the above-described conditions for the numerical examples are listed in Table-1.

The shape of an aspheric surface is expressed in the coordinates with an X-axis in the axial direction and an H-axis in the direction perpendicular to the optical axis, the direction in which light advances being taken as positive, by the following equation:

$$X = (1/R)H^2 / (1 + \sqrt{1-(1+K)(H/R)^2}) + AH^4 + BH^6 + CH^8 + DH^{10}$$

where R is the radius of the osculating sphere, and K, A, B, C and D are the aspheric coefficients.

| Numerical Example 1: | | | |
|---|---|---|---|
| f = 1–10 | Fno = 1:1.65 | 2ω = 60.0°–6.6° | |
| r 1 = 16.594 | d 1 = 0.365 | N 1 = 1.80518 | ν1 = 25.4 |
| r 2 = 6.828 | d 2 = 1.692 | N 2 = 1.60311 | ν2 = 60.7 |
| r 3 = –28.839 | d 3 = 0.038 | | |
| r 4 = 6.378 | d 4 = 0.826 | N 3 = 1.71300 | ν3 = 53.8 |
| r 5 = 19.459 | d 5 = Variable | | |
| r 6 = 9.036 | d 6 = 0.173 | N 4 = 1.83481 | ν4 = 42.7 |
| r 7 = 1.999 | d 7 = 0.979 | | |
| r 8 = –2.548 | d 8 = 0.173 | N 5 = 1.69680 | ν5 = 55.5 |
| r 9 = –2.548 | d 9 = 0.567 | N 6 = 1.84666 | ν6 = 23.8 |
| r 10 = –66.371 | d 10 = Variable | | |
| r 11 = 15.654 | d 11 = 0.134 | N 7 = 1.60311 | ν7 = 60.7 |
| r 12 = 2.615 | d 12 = 1.202 | | |
| r 13 = (Stop) | d 13 = 0.288 | | |
| r 14 = 6.995 | d 14 = 1.038 | N 8 = 1.60342 | ν8 = 38.0 |
| r 15 = –7.386 | d 15 = Variable | | |
| r 16 = 18.068 | d 16 = 0.653 | N 9 = 1.51633 | ν9 = 64.2 |
| r 17 = –7.391 | d 17 = 0.028 | | |
| r 18 = 9.398 | d 18 = 0.173 | N10 = 1.80518 | ν10 = 25.4 |
| r 19 = 3.107 | d 19 = 1.153 | N11 = 1.48749 | ν11 = 70.2 |
| r 20 = 6.861 | d 20 = Variable | | |
| r 21 = 4.171 | d 21 = 0.500 | N12 = 1.48749 | ν12 = 70.2 |
| r 22 = 9.997 | d 22 = 0.769 | | |
| r 23 = ∞ | d 23 = 0.480 | N13 = 1.51633 | ν13 = 64.2 |
| r 24 = ∞ | d 24 = 3.846 | N14 = 1.60342 | ν14 = 38.0 |
| r 25 = ∞ | | | |

| The Values of the Aspheric Coefficients for r 14 | | |
|---|---|---|
| K = –4.690 × 10$^{-1}$ | A = 1.348 × 10$^{-4}$ | B = 1.148 × 10$^{-4}$ |
| C = 1.867 × 10$^{-6}$ | D = –1.461 × 10$^{-5}$ | |

| Variable | Focal Length | | |
|---|---|---|---|
| Separations | 1.00 | 3.16 | 10.00 |
| d 5 | 0.17 | 3.13 | 5.10 |
| d 10 | 5.22 | 2.26 | 0.29 |
| d 15 | 3.66 | 2.52 | 3.66 |
| d 20 | 0.77 | 1.91 | 0.77 |

| Numerical Example 2: | | | |
|---|---|---|---|
| f = 1–10 | Fno = 1:1.65 | 2ω = 57.2°–6.2° | |
| r 1 = 15.795 | d 1 = 0.345 | N 1 = 1.80518 | ν1 = 25.4 |
| r 2 = 6.848 | d 2 = 1.563 | N 2 = 1.60311 | ν2 = 60.7 |
| r 3 = –34.179 | d 3 = 0.036 | | |
| r 4 = 6.336 | d 4 = 0.781 | N 3 = 1.69680 | ν3 = 55.5 |
| r 5 = 18.466 | d 5 = Variable | | |

Numerical Example 2:

| | | | |
|---|---|---|---|
| r 6 = 6.719 | d 6 = 0.163 | N 4 = 1.88300 | υ4 = 40.8 |
| r 7 = 1.886 | d 7 = 0.883 | | |
| r 8 = −2.618 | d 8 = 0.163 | N 5 = 1.69680 | υ5 = 55.5 |
| r 9 = 2.618 | d 9 = 0.527 | N 6 = 1.84666 | υ6 = 23.9 |
| r 10 = −28.311 | d 10 = Variable | | |
| r 11 = 36.586 | d 11 = 0.145 | N 7 = 1.60311 | υ7 = 60.7 |
| r 12 = 2.965 | d 12 = 1.463 | | |
| d 13 = (Stop) | d 13 = 0.272 | | |
| r 14 = 7.230 | d 14 = 1.163 | N 8 = 1.58313 | υ = 59.4 |
| r 15 = −6.015 | d 15 = Variable | | |
| r 16 = −19.888 | d 16 = 0.636 | N 9 = 1.48749 | υ = 70.2 |
| r 17 = −6.758 | d 17 = 0.027 | | |
| r 18 = 6.751 | d 18 = 0.200 | N 10 = 1.80518 | υ10 = 25.4 |
| r 19 = 3.233 | d 19 = 1.163 | N 11 = 1.48749 | υ11 = 70.2 |
| r 20 = −7.636 | d 20 = Variable | | |
| r 21 = 5.161 | d 21 = 0.454 | N 12 = 1.48749 | υ12 = 70.2 |
| r 22 = 22.483 | d 22 = 0.727 | | |
| r 23 = ∞ | d 23 = 0.454 | N 13 = 1.51633 | υ13 = 64.2 |
| r 24 = ∞ | d 24 = 3.636 | N 14 = 1.60342 | ü14 = 38.0 |
| r 25 = ∞ | | | |

The Values of the Aspheric Coefficients for r 14

$K = 8.578 \times 10^{-1}$  $A = -1.261 \times 10^{-3}$  $B = -1.258 \times 10^{-4}$
$C = 1.587 \times 10^{-4}$  $D = -3.942 \times 10^{-5}$

| Variable Separations | Focal Length | | |
|---|---|---|---|
| | 1.00 | 3.01 | 10.00 |
| d 5 | 0.16 | 3.27 | 5.34 |
| d 10 | 5.45 | 2.34 | 0.27 |
| d 15 | 4.24 | 3.26 | 4.24 |
| d 20 | 0.73 | 1.71 | 0.73 |

Numerical Example 3:

f = 1–10    Fno = 1:1.65–1.90    2ω = 57.2°–6.2°

| | | | |
|---|---|---|---|
| r 1 = 8.165 | d 1 = 0.345 | N 1 = 1.84666 | υ1 = 23.8 |
| r 2 = 4.862 | d 2 = 1.454 | N 2 = 1.60311 | υ2 = 60.7 |
| r 3 = −45.916 | d 3 = 0.036 | | |
| r 4 = 5.564 | d 4 = 0.545 | N 3 = 1.69680 | υ3 = 55.5 |
| r 5 = 12.817 | d 5 = Variable | | |
| r 6 = 8.554 | d 6 = 0.163 | N 4 = 1.88300 | υ4 = 40.8 |
| r 7 = 1.590 | d 7 = 0.554 | | |
| r 8 = −2.600 | d 8 = 0.163 | N 5 = 1.69680 | υ5 = 55.5 |
| r 9 = 2.396 | d 9 = 0.181 | | |
| r 10 = 2.821 | d 10 = 0.400 | N 6 = 1.84666 | υ6 = 23.8 |
| r 11 = −89.503 | d 11 = Variable | | |
| r 12 = −18.517 | d 12 = 0.145 | N 7 = 1.60311 | υ7 = 60.7 |
| r 13 = 2.879 | d 13 = 0.909 | | |
| r 14 = (Stop) | d 14 = 0.272 | | |
| r 15 = 5.932 | d 15 = 0.800 | N 8 = 1.58313 | υ8 = 59.4 |
| r 16 = −3.558 | d 16 = Variable | | |
| r 17 = −22.271 | d 17 = 0.363 | N 9 = 1.48749 | υ9 = 70.2 |
| r 18 = −10.976 | d 18 = 0.027 | | |
| r 19 = 9.225 | d 19 = 0.200 | N 10 = 1.80518 | υ10 = 25.4 |
| r 20 = 3.168 | d 20 = 1.090 | N 11 = 1.48749 | υ11 = 70.2 |
| r 21 = −5.290 | d 21 = Variable | | |
| r 22 = 4.356 | d 22 = 0.454 | N 12 = 1.48749 | υ12 = 70.2 |
| r 23 = 98.536 | d 23 = 0.727 | | |
| r 24 = ∞ | d 24 = 0.454 | N 13 = 1.51633 | υ13 = 64.2 |
| r 25 = ∞ | d 25 = 3.636 | N 14 = 1.60342 | υ14 = 38.0 |
| r 26 = ∞ | | | |

The Values of the Aspheric Coefficients for r 15

$K = -1.550$  $A = -1.767 \times 10^{-3}$  $B = -1.344 \times 10^{-4}$
$C = 1.869 \times 10^{-4}$  $D = -4.102 \times 10^{-5}$

| Variable Separations | Focal Length | | |
|---|---|---|---|
| | 1.00 | 3.10 | 10.00 |
| d 5 | 0.16 | 2.65 | 4.30 |

Numerical Example 3 (continued):

| | | | |
|---|---|---|---|
| d 11 | 4.36 | 1.87 | 0.22 |
| d 16 | 4.19 | 2.42 | 4.19 |
| d 21 | 0.36 | 2.13 | 0.36 |

Numerical Example 4:

f = 1–10    Fno = 1:1.65    2ω = 60.0°–6.6°

| | | | |
|---|---|---|---|
| r 1 = 18.950 | d 1 = 0.365 | N 1 = 1.80518 | υ1 = 25.4 |
| r 2 = 8.112 | d 2 = 1.653 | N 2 = 1.60311 | υ2 = 60.7 |
| r 3 = −61.728 | d 3 = 0.038 | | |
| r 4 = 7.601 | d 4 = 0.826 | N 3 = 1.69680 | υ3 = 55.5 |
| r 5 = 24.189 | d 5 = Variable | | |
| r 6 = 6.293 | d 6 = 0.173 | N 4 = 1.88300 | υ4 = 40.8 |
| r 7 = 2.090 | d 7 = 1.065 | | |
| r 8 = −3.133 | d 8 = 0.173 | N 5 = 1.69680 | υ5 = 55.5 |
| r 9 = 3.133 | d 9 = 0.557 | N 6 = 1.84666 | υ6 = 23.8 |
| r 10 = −19.612 | d 10 = Variable | | |
| r 11 = −12.878 | d 11 = 0.153 | N 7 = 1.60311 | υ7 = 60.7 |
| r 12 = 3.014 | d 12 = 0.961 | | |
| r 13 = (Stop) | d 13 = 0.288 | | |
| r 14 = 0.480 | d 14 = 0.769 | N 8 = 1.58313 | υ8 = 59.4 |
| r 15 = −517 | d 15 = Variable | | |
| r 16 = −26.703 | d 16 = 0.673 | N 9 = 1.48749 | υ9 = 70.2 |
| r 17 = −5.997 | d 17 = 0.028 | | |
| r 18 = 6.652 | d 18 = 0.211 | N 10 = 1.80518 | υ10 = 25.4 |
| r 19 = 3.309 | d 19 = 1.230 | N 11 = 1.48749 | υ11 = 70.2 |
| r 20 = −8.077 | d 20 = Variable | | |
| r 21 = 5.040 | d 21 = 0.480 | N 12 = 1.48749 | υ12 = 70.2 |
| r 22 = 19.927 | d 22 = 0.769 | | |
| r 23 = ∞ | d 23 = 0.480 | N 13 = 1.51633 | υ13 = 64.2 |
| r 24 = ∞ | d 24 = 3.846 | N 14 = 1.60342 | υ14 = 38.0 |
| r 25 = ∞ | | | |

The Values of the Aspheric Coefficients for r 14

$K = -8.451 \times 10^{-1}$  $A = -7.628 \times 10^{-4}$  $B = 6.496 \times 10^{-5}$
$C = 2.701 \times 10^{-6}$  $D = -7.249 \times 10^{-6}$

| Variable Separations | Focal Length | | |
|---|---|---|---|
| | 1.00 | 3.14 | 10.00 |
| d 5 | 0.17 | 4.11 | 6.74 |
| d 10 | 6.80 | 2.86 | 0.23 |
| d 15 | 3.96 | 3.05 | 3.96 |
| d 20 | 0.77 | 1.68 | 0.77 |

TABLE 1

| Condition No. | Factor | Numerical Example | | | |
|---|---|---|---|---|---|
| | | 1 | 2 | 3 | 4 |
| (1) | f4/f5 | 0.476 | 0.560 | 1.054 | 0.501 |
| (2) | f3/f4 | 5.205 | 2.429 | 0.967 | 9.122 |
| (3) | |f2/fw| | 1.731 | 1.818 | 1.455 | 2.308 |

According to the invention, the rules of design for the refractive powers of the five lens units and the conditions for the movements of the second and fourth lens units are set forth as described before. In addition, the focusing lens configuration of moving the fourth lens unit is employed. With these, the zooming range is widened to about 10 in such a manner that the size of the entire lens system is minimized. Nonetheless, while good correction of aberrations is attained throughout the entire zooming range, the variation of aberrations with focusing is limited to a minimum. Thus, it is made possible to achieve a zoom lens of the rear focus type which has a long back focal distance and a large relative aperture of 1.6 in F-number, while still keeping high optical performance.

What is claimed is:

1. A zoom lens comprising, from an object side to an image side, a fixed first lens unit of positive refractive power, a second lens unit of negative refractive power, a fixed third lens unit of positive refractive power, a fourth lens unit of positive refractive power and a fifth lens unit of positive refractive power, said second lens unit and said fourth lens unit being moved to effect zooming, wherein letting the focal length of the i-th lens unit be denoted by fi, the following condition is satisfied:

$$0.4 < f4/f5 < 1.2$$

2. A zoom lens according to claim 1, wherein said third lens unit includes, from the object side to the image side, a front lens sub-unit of negative refractive power, a stop and a rear lens sub-unit of positive refractive power.

3. A zoom lens according to claim 2, wherein said fifth lens unit includes a single lens of meniscus shape convex toward the object side, said zoom lens satisfying the following conditions:

$$0.8 < f3/f4 < 10$$

$$1.0 < |f2/fw| < 2.5$$

where fw is the focal length of the entire lens system in a wide-angle end.

4. A zoom lens according to claim 2, wherein said rear lens sub-unit includes a single lens having an aspheric surface.

5. A zoom lens according to claim 1, wherein said fourth lens unit is made movable for focusing.

* * * * *

UNITED STATES PATENT AND TRADEMARK OFFICE
CERTIFICATE OF CORRECTION

PATENT NO. : 5,537,255
DATED : July 16, 1996
INVENTOR(S) : NOBUYUKI TOCHIGI

It is certified that error appears in the above-indentified patent and that said Letters Patent is hereby corrected as shown below:

On the title page, item:

[75] INVENTOR:

"Kanagawa" should read --Kawasaki--.

COLUMN 3:

Line 31, "show" should read --show graphs--;
Line 33, "show" should read --show graphs--; and
Line 35, "show" should read --show graphs--.

COLUMN 5:

Line 24, "exceeding" should read --exceeding the--.

COLUMN 6:

Line 32, "r9=-2.548" should read --r9=2.548--.

COLUMN 7:

Line 7, "$v6=23.9$" should read --$v6=23.8$--;
Line 10, "$v=59.4$" should read --$v8=59.4$--
Line 11, "$v=70.2$" should read --$v9=70.2$--; and
Line 19, "$ũ14=38.0$" should read --$v14=38.0$--.

UNITED STATES PATENT AND TRADEMARK OFFICE
CERTIFICATE OF CORRECTION

PATENT NO. : 5,537,255
DATED : July 16, 1996
INVENTOR(S) : NOBUYUKI TOCHIGI

It is certified that error appears in the above-indentified patent and that said Letters Patent is hereby corrected as shown below:

<u>COLUMN 8</u>:

Line 24, "r15=-517" should read --r15=-5.517--.

<u>COLUMN 10</u>:

Line 12, "lensub-unit" should read --lens sub-unit--.

Signed and Sealed this

Twenty-eighth Day of January, 1997

Attest:

BRUCE LEHMAN

*Attesting Officer*   *Commissioner of Patents and Trademarks*